Jan. 2, 1940.   J. J. HENDLER   2,185,174
CAKE PRESSING AND MOLDING MACHINE
Filed June 24, 1939   2 Sheets-Sheet 2
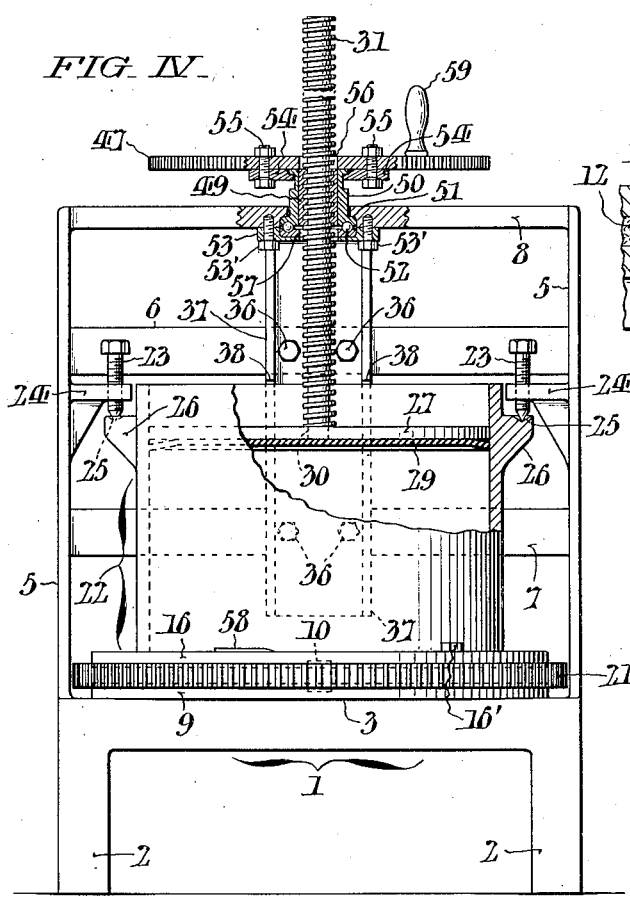
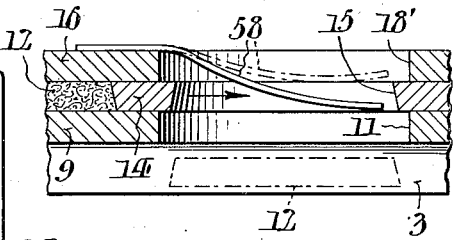
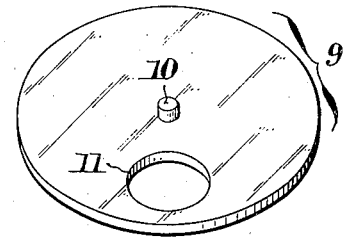
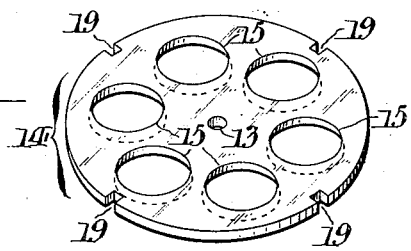
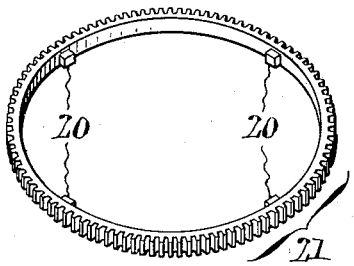
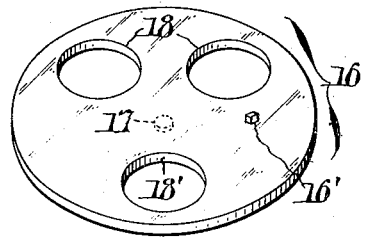
WITNESSES:
Thomas W. Kerr, Jr.
Woodrow Stevenson
INVENTOR:
John J. Hendler,
BY Paul & Paul
ATTORNEYS.

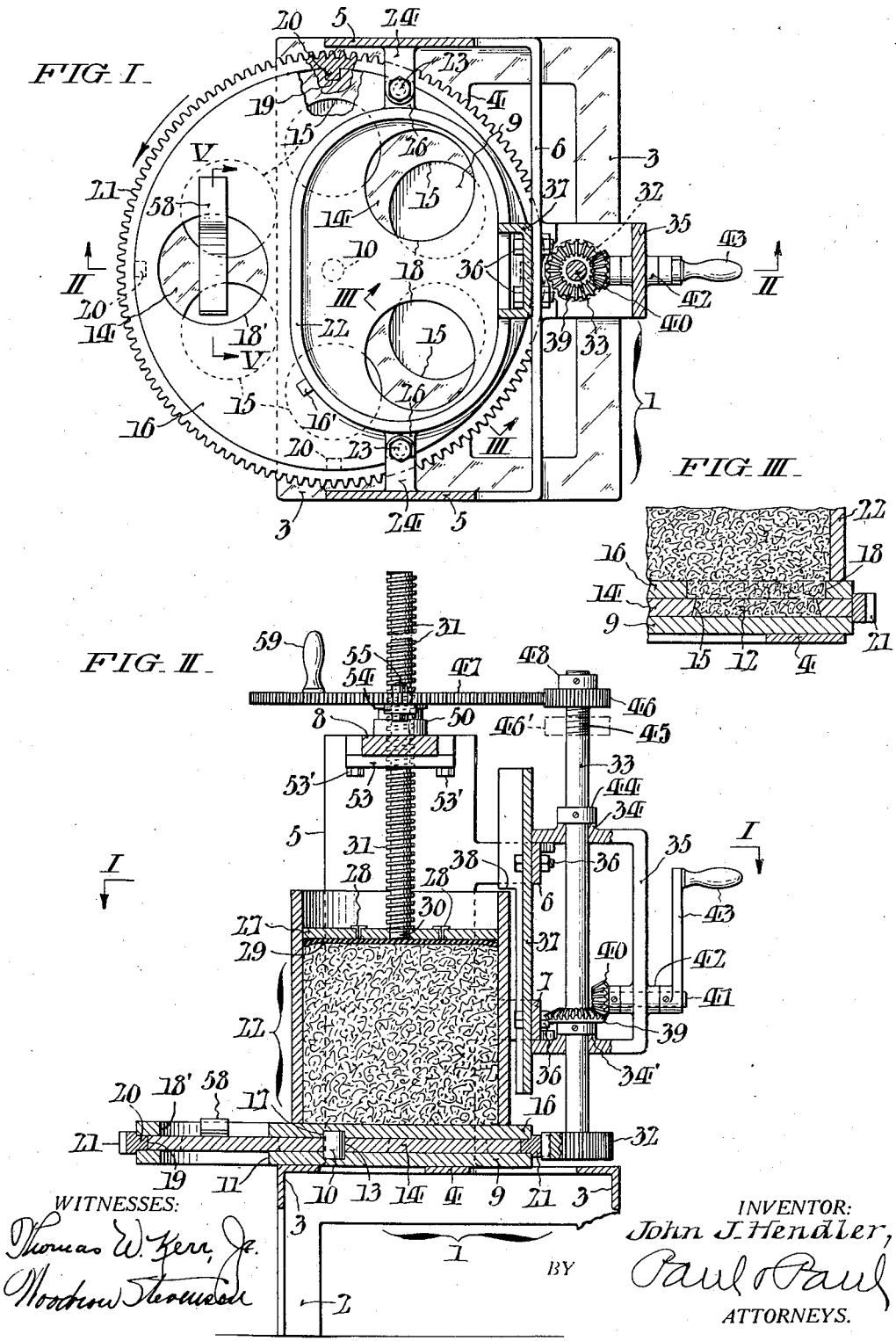

Patented Jan. 2, 1940

2,185,174

UNITED STATES PATENT OFFICE 2,185,174

CAKE PRESSING AND MOLDING MACHINE

John J. Hendler, Burlington, N. J.

Application June 24, 1939, Serial No. 280,955

8 Claims. (Cl. 107—8)

This invention generally relates to machines or apparatus designed to automatically form and subsequently discharge patties, and cakes of pliable or semi-plastic character and, more particularly, to a machine for producing and discharging comestible articles ready for cooking. Furthermore this application is in part a continuation of an application filed by the present inventor under Serial No. 253,809 on January 31, 1939.
The primary object of this invention is to provide a simple and efficient machine for handling previously minced comestibles, and forming therefrom cakes of uniform size and even weight.
Another object is the provision of a machine of the indicated species which is well adapted to the production of "hamburger" patties or cakes in a thoroughly sanitary and expeditious manner.
A further object is to provide a machine, of the type above referred to, characterized by a novel rotary former, as well as a quick release and coupler mechanism for the presser feed means.
Subsidiary objects and ancillary advantages will be hereinafter noted or become apparent from the following description of a typical embodiment of this invention, as illustrated by the accompanying sheets of drawings, while the features of novelty are more particularly expressed in the concluding claims.

In the drawings:

Fig. I is a staggered plan section, taken approximately as indicated by the arrows I—I in Fig. II.
Fig. II is a vertical section on the plane II—II of Fig. I.
Fig. III is a fragmentary detail section, on a larger scale, taken as indicated by the arrows III—III in Fig. I.
Fig. IV is a part vertical section, and part outside elevation, of the machine as viewed from the left-hand of Fig. II.
Fig. V is a fragmentary section on the plane V—V of Fig. I, but drawn to a larger scale.
Fig. VI is a perspective view of a lower stationary discharge plate hereinafter fully explained.
Fig. VII is a perspective view of an intermediate mold and rotary compressor plate.
Fig. VIII is a similar view of the top or initial feed and former plate; and,
Fig. IX is a perspective view of an annular gear for effecting rotation of the intermediate mold plate.
Referring more in detail to the drawings, which illustrate the application of the present improvements to a machine for pressing and molding "hamburger" cakes, from previously minced and seasoned meat, the reference character 1 comprehensively designates a substantial base embodying angle-section legs 2 and a surrounding top flange 3, with a central cross-brace 4. Rigidly secured to the base 1 are vertical parallelling standards 5, embodying rectangularly related upper and lower horizontal-ties 6, 7, respectively, in addition to a top bridge-piece 8; said standards, ties and bridge-piece being preferably formed as a rigid unit with the base 1. Stationarily seated on, or formed integral with, the base top flange and cross-brace 4 is a bottom disc or plate 9 having a fixedly socketed pin or axis 10, and an eccentrically located aperture or outlet 11 of predetermined size for free discharge therethrough of the molded pattie or cake 12, shown in full-lines in Fig. III and by dot-and-dash lines in Fig. V. Coactive with the bottom disc 9 by a central hole 13 freely engaging the socketed pin 10, is an intermediate rotatable plate 14, having a series of circumferentially-spaced comestible-pressing or mold-apertures 15, and surmounting the latter plate is a stationary or top plate 16 having an axial socket 17 engageable over the upper end of the axis pin 10.

The top plate 16 has feed openings 18 therethrough located for successive axial registration over the outlet 11 in the bottom plate 9; while it is to be remarked that the mold apertures 15 in the rotatable plate 14 are similarly arranged for passage into and out of corresponding registration with respect to the feed openings 18 and outlet 11, while the top plate 16 is provided with a projection 16' for a purpose later set forth.

In order to effect rotation of the mold plate 14, the latter is provided with spaced circumferential notches 19 for engagement with radial lugs 20 inwardly of an annular gear 21; said gear being of a suitable diameter to effect free rotation of the mold plate 14 relative to the stationary bottom and top plates 9, 16.

Seating on the top plate 16 is an appropriate receptacle 22 of sanitary character and preferably, although not essentially, of substantially elliptical contour, said receptacle having a finished base fit on the top plate 16, so that when tightly retained in position by finger-operable set-screws 23 engaging through apertured projections 24, integrally of the vertical standards 5, with their pointed ends in suitable recesses 25 in the upper faces of lateral lugs 26 on the receptacle 22, the latter may be substantially sealed against seepage from the interior outwards. It is also noteworthy that incident to manipulation of the set-screws 23 the top plate 16 by coaction with the axis pin 10 is firmly anchored to the bottom plate 9 and that both said plates are held against rotation on the base flange 3 and cross brace 4. Vertically movable in the receptacle 22 is a plunger 27 having affixed to the inner surface, as by cleats 28, a suitable sanitary element 29 of readily washable material such as rubber, said element having the peripheral edge slightly dished down for initial contact with the "hamburger" and outward compression to prevent passage of juices around the peripheral edge of said plunger during operation of the machine. Attached at one end 30 to the plunger 27 is an actuator or feed-screw 31 for downwardly progressing said plunger. In mesh with the annular gear 21 is a drive-pinion 32 at the lower end of a shaft 33 vertically journaled by appropriate upper-and-lower bearings 34, 34', respectively, of a rigidly sustained saddle-bracket 35, in turn formed integral with, or attached by securing means 36 to the cross-ties 6, 7 and a paralleling channel-section 37. The section 37 may have its flanges cut away at 38 to clear the top edge of the receptacle 22.

Rigidly secured to the shaft 33, adjoining the bearing 34', is a bevel gear 39 meshing with a smaller gear 40, fast on a stub-shaft 41, in a bearing 42 of the bracket 35, and freely rotative by a hand-crank 43, in an obvious manner. A retainer collar 44 is secured to the shaft 33 above the bearing 34 to aid in supporting said shaft against axial movement downwards. At the upper end the shaft 33 is screw-threaded at 45 for reception of an axially movable drive-pinion 46 meshing with a progressing-gear 47 for the feed-screw 31. An abutment collar 48 is secured on the shaft 33 at the upper extremity to limit the travel of the drive-pinion 46 outwardly of said shaft.

Referring again to the feed-screw 31, and as best shown in Fig. IV, the same threadedly engages through a sleeve 49 drifted or otherwise secured in the rotary upper component 50 of a thrust-bearing socketed in and projecting upwardly beyond a shouldered aperture 51 in the bridge piece 8, hereinbefore described; whereas the lower or stationary component 52 of said bearing is sustained against the underside of the bridge-piece 8 by a clamp member 53 and set-screws 53'. The progressing-gear 47 is, in turn, rigidly attached to the rotary component 50 by an appropriate clamp 54 and screw-bolts 55, so as to rotate with said component, and clearance at 56, 57 relative to the thrust bearing components 50 and 52. A flat spring paddle or ejector 58 is rigidly secured to the top plate 16 which projects diametrically well across the forward opening 18', Figs. V and VII and is adapted for movement from the dot-and-dash line position to the full line showing in the former figure, for a purpose later explained.

Having described the structure of the improved cake pressing and molding machine as illustrated, the operation thereof may be briefly explained as follows. Assuming the machine is to be used for the formation of "hamburger" patties or cakes, and that the parts have been assembled as shown, with the receptacle 22 substantially filled with previously minced and seasoned meat, the operator slowly turns the handle 43, which through the gears 39, 40 effects rotation of the vertical shaft 33, and by the gears 46, 47 non-rotatively forces the feed-screw 31 axially downward, said movement being positively ensured by the ovaline or elliptic shape of the receptacle 22 and complemental shape of the plunger 27. At the same time, it is to be observed the top-plate projection 16' effectively restrains said top plate from any rotary movement by abutment with the outer wall of the receptacle 22, with positive retention of the holes 18', 11 in accurate axial coincidence and spacial registration. Concurrently, the mold-plate 14 is rotated by coaction of the drive pinion 32 and annular gear 21 through the medium of the interengaged lugs 20 and notches 19. Incidental to the operations just described, it will be readily seen that the "hamburger" is first forced into the upper stationary plate feed openings 18 and, as the apertures 15 in the rotating mold plate 14 pass thereunder compressively fill said apertures in succession and thereby form the required cakes 12. Continued rotation of the mold plate 14 will consecutively bring the formed and compressed patties or cakes 12 into registration intermediate the opening 18' and the outlet 11 of the bottom plate 9. Incidentally, it may be here remarked that the mold apertures 15 may flare slightly downwards so that when the opening 18' and outlet 11 register as just described, and the ejector 58 automatically flexes from the dot-and-dash line to the full line showings in Fig. V, discharge of the formed patties or cakes 12 as they are moved over the outlet 11 will freely take place.

When the supply of comestible or "hamburger" in the receptacle 22 is exhausted and the cakes 12 in the mold plate 14 are all ejected, the operator grasps a handle 59 projecting upwards from the progressing gear 47 with one hand and reverses rotation of the hand crank 43, whereupon the drive pinion 46 is caused to travel downwards of the shaft screw-threading 45 until it is unmeshed from the gear 47 and automatically descends until it reaches the dot-and-dash line position 46' of Fig. II. The operator thereupon rotates the progressing gear by the handle 59 in reverse with resultant rapid rotation of the feed-screw 31 upwards until the plunger encounters the clamp-member 53, whereupon the receptacle 22 can be readily refilled. By grasping the gear 46 and reversal of the operations just described, said gear will re-mesh with the progressing gear 47 and return the machine to cake producing position, as aforesaid.

Obviously different sized cakes 12 can be produced by simply substituting a differentially apertured mold plate 15; also while the machine has been shown and described as manually operated, it can be easily actuated by a small motor coupled to the shaft 41, after removal of the hand-crank 43, without in any way departing from the inventive subject-matter. It is further to be noted the gears 46, 47 are predeterminedly synchronized with respect to the gears 21, 32 so that, as the mold plate 14 rotates it will deliver the compressed cakes 12 to the outlet 11 without any binding action between the relatively moving and stationary parts of the machine. Also the sanitary element 29 is preferably of a predetermined area relative to the plunger 27 so as to not interfere with downward movement of the latter until it contacts the comestible or "hamburger" when said element will be compressively expanded into seepage preventing or "wiping" contact with the interior surface or wall of the receptacle 11, for the purpose hereinbefore set forth.

From the foregoing it will be appreciated that simplicity and perfect sanitation are positively ensured for the machine as disclosed, in that by quick elevation of the plunger 27, and manual release of the set-screws 23, the receptacle 22 and discs 16, 15 are readily removable for washing; whereas the cleats 28 are releasable for removal of the element 29 for similar treatment.

Finally, while a specific embodiment of the invention has been disclosed, it will be apparent the machine described is readily adaptable to the production of fish cakes, croquettes, or any other ground comestibles without in any way departing from the spirit and scope of the following claims and the state of the prior art permits.

Having thus described my invention, I claim:

1. In a cake forming machine including a base structure, stationary feed and discharge plates with an intervening spacer pin and mounted on the base structure, an apertured mold plate rotatable on the spacer pin between the first mentioned plates, a receptacle on the feed plate for the substance from which the cake formations are made, a plunger in said receptacle, means securing the receptacle in operative position, associated means restraining the feed plate against frictional movement, progressing means including a quick-return device for the plunger, and synchronously coordinated means for rotating the mold plate.

2. In a cake forming machine including a base structure, stationary feed and discharge plates with an intervening spacer pin and mounted on the base structure, an apertured mold plate rotatable on the spacer pin between the first mentioned plates, a receptacle on the feed plate for the substance from which the cake formations are made, a plunger in said receptacle, means securing the receptacle in operative position, associated means restraining the feed plate against frictional movement, progressing means including a quick-return device for the plunger, means for synchronously rotating the mold plate, and means effective to automatically eject each successively formed cake.

3. In a cake forming machine, a base structure including a stationary plate having a discharge orifice therethrough and a central projection, a mold plate pivoted on the stationary plate projection and having circumferentially-spaced cake forming apertures therethrough, a feed plate seating on the mold plate and having a socket coactive with the stationary plate projection, said feed plate also having circumferentially-spaced openings therethrough and one of which is axially registrable above the discharge orifice, a receptacle surmounting the feed plate for the comestible from which the cakes are formed, such receptacle being of a contour to include the feed plate openings with the exception of the one registrable above the stationary plate orifice aforesaid, a plunger in the receptacle having a facing element and a central feed screw, means for holding said receptacle in operative position on the feed-plate, associated means restraining the feed-plate from frictional movement by the mold plate, gear means including a releasable component for axially-progressing the plunger feed screw, said releasable component permitting quick return of the plunger to inactive location, and operatively coordinated gear mechanism for synchronously rotating the mold plate.

4. A cake forming machine as defined in claim 3, further characterized by a flat springy element secured to the feed plate with substantially diametric projection across the opening exteriorly related to the comestible containing receptacle, and said element being flexed downwardly to eject the formed cakes.

5. A cake forming machine as defined in claim 3, wherein the stationary plate embodies an axial projection, said axial projection extending through a central hole in the mold plate with socket engagement in a complemental boring at the underside of the feed plate, said feed plate having an eccentric stop on its upper face, the receptacle for the comestible to be formed into cakes is provided with laterally projecting clamp means, and the feed plate is restrained from pivotal movement by abutment of the eccentric stop against the receptacle outer wall.

6. A cake forming machine as defined in claim 3, wherein the plunger feed screw is non-rotatively sustained and is axially advanced by a progressing gear, the releasable component is in the form of a pinion normally meshing with the progressing gear, and said pinion threadedly engages a drive shaft with capacity for quick axial movement within predetermined limits.

7. A cake forming machine as defined in claim 3, wherein the mold plate is in the form of an apertured plate provided with circumferentially spaced notches, the apertures through said plate flaring slightly outwards, and an annular gear of corresponding inner diameter has similarly located radial lugs for engagement in the disc notches to effect rotation of the mold plate.

8. A cake forming machine as defined in claim 3, wherein the plunger facing element is in the form of a washable sheet of suitable material, detachable cleats for affixing the sheet to the plunger, and said sheet has the peripheral edge surroundingly dished.

JOHN J. HENDLER.